W. BARNES.
Corn-Stalk Cutter.
No. 198,070. Patented Dec. 11, 1877.
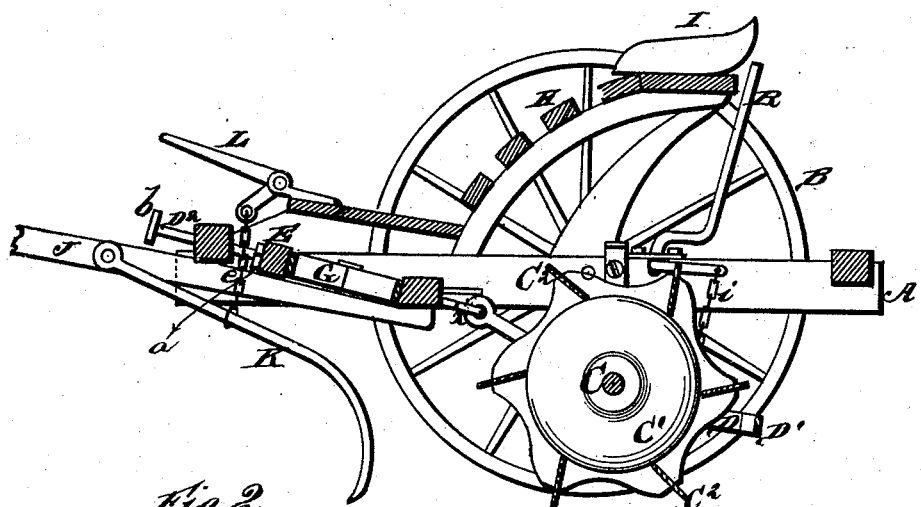
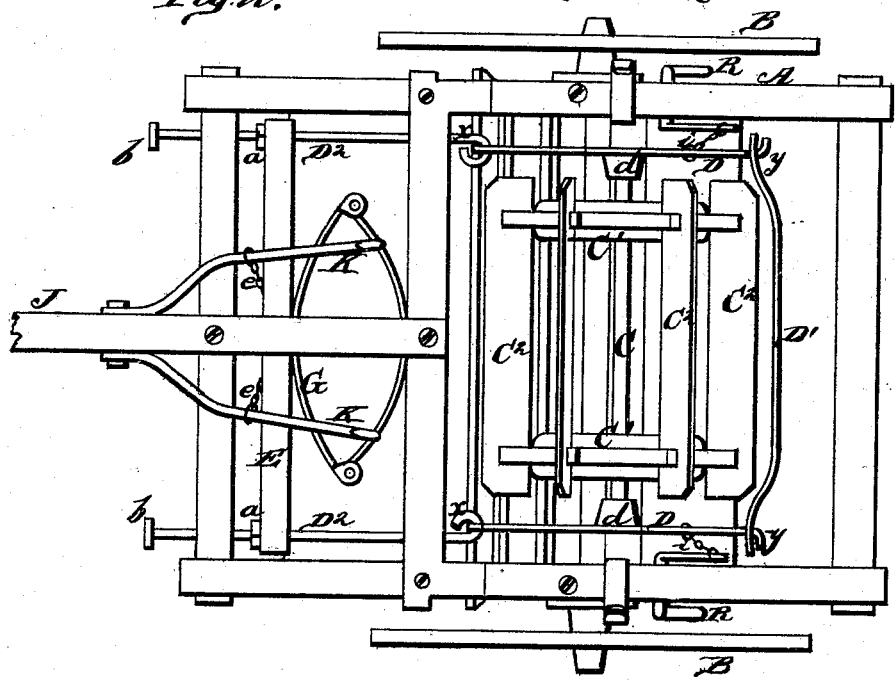

UNITED STATES PATENT OFFICE.

WILSON BARNES, OF MAQUOKETA, IOWA.

IMPROVEMENT IN CORN-STALK CUTTERS.

Specification forming part of Letters Patent No. 198,070, dated December 11, 1877; application filed November 3, 1877.

*To all whom it may concern:*

Be it known that I, WILSON BARNES, of Maquoketa, in the county of Jackson and State of Iowa, have invented a new and valuable Improvement in Corn-Stalk-Cutters; and I do hereby declare that the following is a full, clear, and exact description of the construction and operation of the same, reference being had to the annexed drawings, making a part of this specification, and to the letters and figures of reference marked thereon.

Figure 1 of the drawings is a longitudinal vertical sectional view of my corn-stalk cutter, and Fig. 2 is a plan view of the same.

The nature of my invention consists in the construction and arrangement of a corn-stalk cutter, as will be hereinafter more fully set forth.

The annexed drawing, to which reference is made, fully illustrates my invention.

A represents the main frame of the machine, provided on each side with a spindle, upon which a wheel, B, is placed.

The cutter consists of a central shaft, C, on which are secured two heads, $C^1$ $C^1$, and these heads are provided with suitable projecting ears or lugs. $C^2$ $C^2$ are the cutting-blades, fastened to the lugs on the heads $C^1$, and connecting the same.

The ends of the shaft C are inserted in inwardly-projecting bosses or bearings $d$ $d$ upon two arms, D D, which are at their rear ends connected by a cross-bar, $D^1$, and at their front ends connected to the draw-bars $D^2$ $D^2$. These draw-bars pass through the cross-bars of the main frame A, and through a spring-bar, E, placed between said cross-bars. Between this spring-bar and the rear cross-bar of the frame are interposed one or more springs, G, of any suitable form or material.

Nuts $a$ $a$ are placed on the draw-bars $D^2$ $D^2$ in front of and against the spring-bar E, and also other nuts, $b$ $b$, upon the front ends of the drag-bars.

The nuts $a$ $a$ are for the purpose of regulating the tension of the spring or springs G, and thus give the necessary strain to them.

The nuts $b$ on the ends of the draw-bars relieve the spring of heavy strain if the cutter should get clogged.

The interposition of the spring or springs G, as described, prevents all jarring or jerking on the horses from the chopping nature of the cutter, and also gives the cutter increased chopping motion as it rolls from one knife to another, because it has a continual give-and-take motion.

The joints $x$ $x$, between the arms D D and draw-bars $D^2$ $D^2$, and also between said arms and the cross-bar $D^1$ at $y$ $y$, are loose free-working joints, which give the cutter freedom to adjust itself to the ground or land.

The machine is covered with slats H, to prevent accidents, with the seat I elevated out of the dust.

J is the tongue, made fast to the main frame, and provided on each side with a curved hook, K, for straightening the stalks in front of the cutter. These hooks are, by means of chains $e$ $e$, connected with a foot-lever, L, so that they can be raised out of the ground when required.

The cutter is also raised up from the ground by means of crank-levers R R—one on each side of the machine—connected by chains $i$ $i$ with the arms D D, as shown.

What I claim as new, and desire to secure by Letters Patent, is—

1. The combination, with the revolving cutter, of the draw-bars $D^2$ $D^2$, frame A, one or more springs, G, spring-bar E, and nuts $a$ $a$ and $b$ $b$ on the draw-bars, substantially as and for the purposes herein set forth.

2. The combination, with the revolving cutter C $C^1$ $C^2$, of the arms D D, cross-bar $D^1$, and draw-bars $D^2$ $D^2$, all connected together by loose joints to form a flexible frame, substantially as and for the purposes herein set forth.

In testimony that I claim the above, I have hereunto subscribed my name in the presence of two witnesses.

WILSON BARNES.

Witnesses:
F. E. ADAMS,
FRANKLIN TROUT.